March 18, 1930.  A. O. AUSTIN  1,750,770
INSULATOR PIN
Filed Aug. 9, 1922
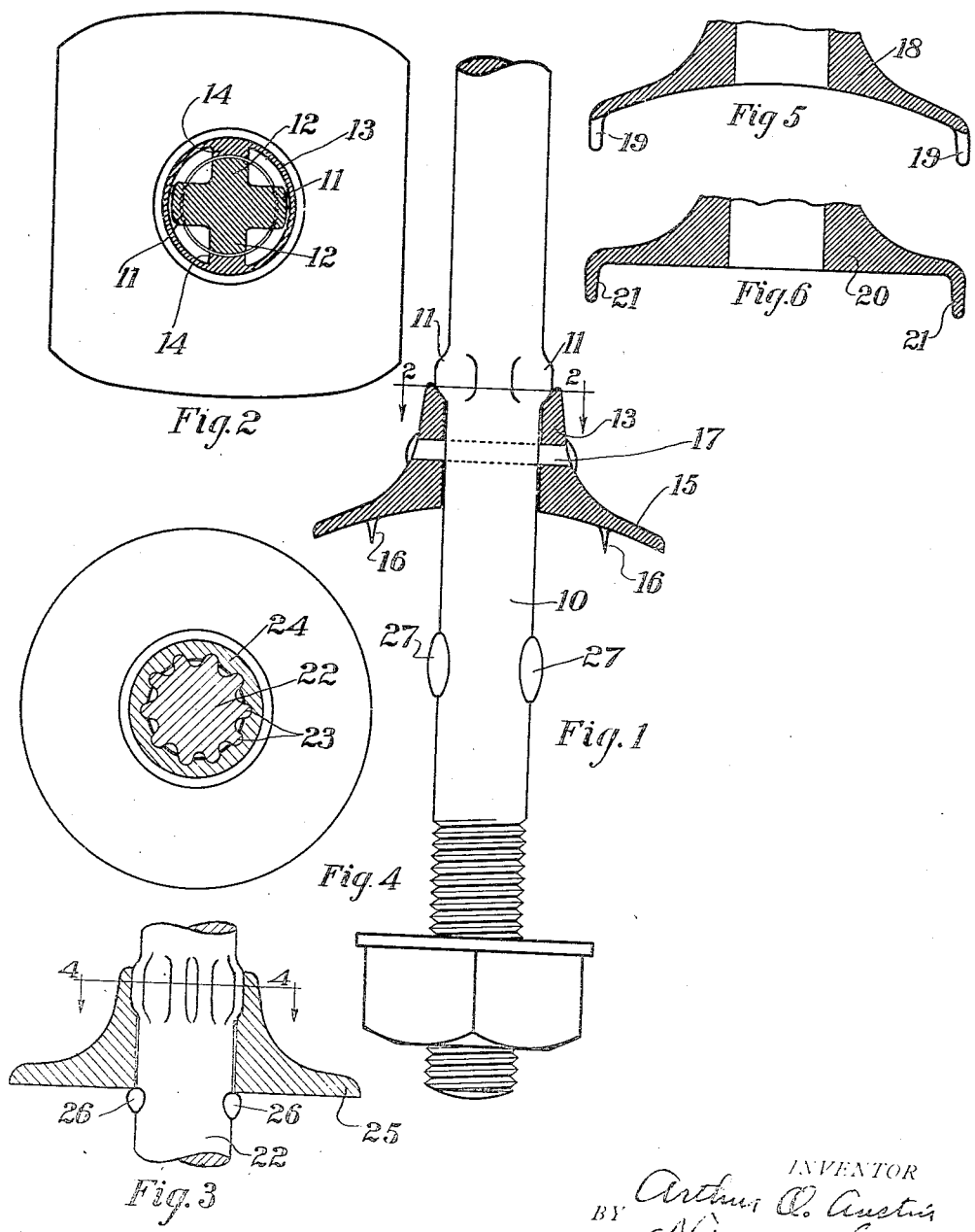

Patented Mar. 18, 1930

1,750,770

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

INSULATOR PIN

Application filed August 2, 1922. Serial No. 579,136.

This invention relates to supporting pins for insulators and has for its object the provision of such devices which shall be economical to manufacture, convenient to install and efficient in operation.

The invention is exemplified in the combination and arrangement of the parts shown in the accompanying drawing and described in the following specifications, and it is more particularly pointed out in the appended claims.

In the drawings:

Fig. 1 is an elevation with parts in section showing one embodiment of the present invention.

Fig. 2 is a section of line 2—2 of Fig. 1.

Fig. 3 is a fragmentary view showing a modified form of the invention.

Fig. 4 is a section on line 4—4 of Fig. 3.

Figs. 5 and 6 show modified forms of supporting flanges.

The numeral 10 designates an insulator pin comprising upper and lower sections of substantially equal diameters and formed from uniform stock bar. Between the upper and lower sections the pin 10 is modified in cross-section to provide projecting flanges 11 and 12. The cross-sectional shape may be secured by means of dies, by forging or by any suitable manufacturing operation. The modified cross-section produces a better distribution of the material of the pin for resisting bending moments and the flanges may be of unequal length to give greatest strength in the direction in which bending is most likely to take place.

They also provide projections for engaging the top of a supporting sleeve 13. Where the parts are shaped as shown in cross-section in Fig. 2 the flanges 12 retain the original diameter of the pin while the material is pressed outwardly to cause the flanges 11 to project beyond the pin surface. In this form the flanges 11 alone will rest upon the supporting sleeve 13. The upper portion of the sleeve 13 may be provided with inwardly extending lugs 14 which in conjunction with flanges 11 limit rotation of the pin 10 in the socket provided by the sleeve 13. The sleeve 13 is provided with a projecting flange 15 forming a supporting base for the pin which may be curved on its lower face to fit the surface of a cross arm and may be provided with teeth 16 to enter the surface and lock the flange against rotation. If it is desired to hold the pin 10 in fixed position relative to the sleeve 13 a lock pin 17 may be passed thru registering openings in the sleeve and insulator pin to hold the parts from relative rotation and lugs 27 may be formed on the pin to bite into the wood of a cross-arm and hold the pin against rotation in its socket. In place of teeth 16, a supporting flange 18, Fig. 5, may be provided having lugs 19 at its edges for extending over the edges of the cross arm and holding the flange against rotation.

In Fig. 6 another form of base 20 is shown having the edges 21 thereof, bent down to engage the sides of the cross arm. In the form shown in Figs. 3 and 4, the pin 22 is provided with a plurality of peripherally spaced lugs 23 which are pressed outwardly from the face of the pin by suitable manufacturing methods and which rest in registering recesses in the sleeve 24 on the base 25. The lugs 23 not only provide supports for the pin but also, prevent relative rotation between the pin and base. After the base is in place on the pin, lugs 26 may be formed directly beneath the base to hold it in place. These lugs may be produced by pinching portions of the pin with suitable force to cause the material to be pressed outwardly to form the lugs. Lugs similar to 27 shown in Fig. 1 may be formed at other portions on the pin to bite into the wood of a cross arm and hold it against rotation in its socket.

I claim:

1. An insulator support comprising a rod of substantially uniform cross-sectional area throughout its length, said rod having a portion of the metal thereof pinched outwardly at a point between the ends of the rod to provide oppositely disposed outwardly-projecting flanges substantially equal in circumferential width to the ribs of metal left between said flanges, a support for said pin having a sleeve portion, and a radially extending flange connected with said sleeve portion, said sleeve portion having a circumferential recess in the top thereof for receiving said projecting flanges, there being a projection extending into said recess for engaging the projecting flanges on said pin to limit rotation of said pin in said sleeve, the portion of said pin below said sleeve being substantially equal in diameter to the portion of said pin above said outwardly extending flanges.

2. An insulator support comprising a rod of substantially uniform cross-sectional area throughout its length, said rod having a portion of the metal thereof pinched outwardly at a point between the ends of the rod to provide oppositely disposed outwardly-projecting flanges, a support for said pin having a sleeve portion, a radially extending flange connected with said sleeve portion, said sleeve portion having a circumferential recess in the top thereof for receiving said projecting flanges, there being a projection extending into said recess for engaging the projecting flanges on said pin to limit rotation of said pin in said sleeve, means on said flange for engaging a support to prevent rotation of said sleeve, and additional means on said pin below said flange for preventing rotation of said pin in said support.

In testimony whereof I have signed my name to this specification on this 29th day of July, A. D., 1922.

ARTHUR O. AUSTIN.